(12) United States Patent  (10) Patent No.: US 7,496,357 B2
Dunn et al.                  (45) Date of Patent:  Feb. 24, 2009

(54) AUTOMATED TELEPHONE ASSISTANT DEVICE AND ASSOCIATED METHODS

(75) Inventors: Julie Dunn, Grayson, GA (US); Barrett Kreiner, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 539 days.

(21) Appl. No.: 10/090,368

(22) Filed: Mar. 4, 2002

(65) Prior Publication Data
US 2004/0038673 A1  Feb. 26, 2004

(51) Int. Cl.
H04M 1/56 (2006.01)
H04M 15/06 (2006.01)

(52) U.S. Cl. .............. 455/417; 379/8; 379/142.01; 379/142.02; 379/142.03; 379/142.04; 379/142.05; 379/142.06; 379/142.07; 379/142.08; 379/142.09; 455/418

(58) Field of Classification Search ........... 379/8, 379/142.01, 142.02, 142.03, 142.04, 142.05, 379/142.06, 142.07, 142.08, 142.09, 201.01, 379/210.02; 455/414.1, 415, 417, 418
See application file for complete search history.

(56) References Cited

U.S. PATENT DOCUMENTS

| | | | | |
|---|---|---|---|---|
| 4,107,476 A | * | 8/1978 | Henderson | 379/375.01 |
| 5,233,649 A | * | 8/1993 | Guerra, Jr. | 379/372 |
| 5,802,467 A | * | 9/1998 | Salazar et al. | 455/420 |
| 5,978,451 A | * | 11/1999 | Swan et al. | 379/88.24 |
| 6,021,176 A | * | 2/2000 | McKendry et al. | 379/35 |
| 6,122,347 A | * | 9/2000 | Borland | 379/70 |
| 6,219,409 B1 | * | 4/2001 | Smith et al. | 379/106.09 |
| 6,473,078 B1 | * | 10/2002 | Ikonen et al. | 345/211 |
| 6,823,354 B1 | * | 11/2004 | Kynast et al. | 709/200 |
| 7,086,075 B2 | | 8/2006 | Swix et al. | |
| 2001/0003706 A1 | * | 6/2001 | Warburton et al. | 455/463 |

* cited by examiner

*Primary Examiner*—Alexander Eisen
*Assistant Examiner*—Matthew W Genack
(74) *Attorney, Agent, or Firm*—Scott P. Zimmerman, PLLC

(57) ABSTRACT

An automated telephone assistant device and associated methods including a base unit in communication with a telephone network, wherein the base unit is operable for executing a first algorithm disposed within the base unit and selectively allowing a telephone call received from the telephone network to be transmitted to a telephone handset belonging to a user and selectively preventing the telephone call received from the telephone network from being transmitted to the telephone handset belonging to the user. Optionally, the automated telephone assistant device also including an extension control device in communication with the base unit, wherein the extension control device is associated with a predetermined telephone extension and assists the base unit in selectively allowing the telephone call received from the telephone network to be transmitted to the telephone handset belonging to the user and selectively preventing the telephone call received from the telephone network from being transmitted to the telephone handset belonging to the user. The base unit and the extension control device communicating via a plurality of signals, wherein the plurality of signals direct the extension control device to generate a ring event for the telephone handset associated with the predetermined telephone extension.

33 Claims, 5 Drawing Sheets

AUTOMATED TELEPHONE ASSISTANT DEVICE AND ASSOCIATED METHODS

FIELD OF THE INVENTION

The present invention relates generally to the field of telecommunications. More specifically, the present invention relates to an automated telephone assistant device which acts as a gate that a caller must pass through before he or she may communicate with a user directly. The present invention also relates to associated methods.

BACKGROUND OF THE INVENTION

It is common to receive unwanted or undesired telephone calls in a residence or in a small office. These telephone calls may be from an unwanted caller or may be received at an undesired time. It may be desirable for telephone calls from an unwanted caller to be identified and blocked before the telephone calls reach a user's telephone. Alternatively, it may be desirable for such telephone calls to be identified and answered by voicemail. Similarly, it may be desirable for telephone calls received at an undesired time to be blocked before the telephone calls reach the user's telephone, and/or for such telephone calls to be identified and answered by voicemail. These telephone calls may be wrong numbers, harassing sales calls, or pranks.

It may also be desirable to receive telephone calls only in predetermined rooms of a residence or offices of a small office building at predetermined times. A conventional residential telephone system includes a network interface device ("NID") disposed outside the residence. The NID receives telephone calls from one or more central offices via a trunk line. These central offices may include, for example, Class-1 regional central offices, Class-2 sectional central offices, Class-3 primary central offices, Class-4 toll offices, and Class-5 end offices. The NID transmits the telephone calls to one or more telephones disposed inside the residence via one or more telephone lines. It may be desirable, for example, to receive telephone calls only on a master bedroom telephone in the middle of the night, while telephone calls to a kitchen telephone and a child's bedroom telephone on the same telephone line are blocked.

Thus, what is needed is a device for a residence or a small office that functions like a key system or a public branch exchange ("PBX") utilized in large office buildings. A conventional business telephone system includes a key system or a PBX disposed inside the large office building. The key system or the PBX receive telephone calls from the one or more central offices via the trunk line and transmit the telephone calls to one or more telephones disposed inside the large office building via one or more telephone lines. A key system allows a large number of telephones to share a relatively small number of telephone lines. For example, a typical key system may allow about 4-150 telephones to share about 2-100 telephone lines. A key system may also accommodate, for example, facsimile ("fax") machines or personal computers ("PCs"), acting as a local-area network ("LAN"). A PBX is a transmission and information processing system that may handle about one-hundred to several thousand telephone lines, providing such functions as caller identification ("caller ID") services, telephone call blocking services, automated attendant services, voicemail, least-cost routing, energy management services, and integrated voice and data services.

In areas where an appropriate telephone network is located, services such as caller ID, telephone call blocking, and voicemail may be purchased from a telephone services provider. For example, if a telephone is busy, or a fax machine or a PC having a telephone modem is being used, an incoming telephone call is automatically captured in the telephone network and redirected to voicemail. An incoming fax may be redirected to an email system. Such telephone networks, however, are external to the residence or small office, and are not available in all areas. Thus, what is needed is an internal automated telephone assistant device which acts as a gate that a caller must pass through before he or she may communicate with a user directly.

BRIEF SUMMARY OF THE INVENTION

The present invention provides an automated telephone assistant device which acts as a gate that a caller must pass through before he or she may communicate with a user directly. The automated telephone assistant device allows the user to identify and block telephone calls from an unwanted caller or received at an undesired time. The automated telephone assistant device also allows the user to receive telephone calls only in predetermined rooms of a residence or offices of a small office building at predetermined times. When these blocking functions are activated, the automated telephone assistant device further allows the user to identify and selectively receive telephone calls from one or more predetermined callers at predetermined times. For example, when the blocking functions are activated in the middle of the night, the automated telephone assistant device allows the user to identify and selectively receive telephone calls from family members.

In one embodiment of the present invention, an automated telephone assistant device includes a base unit in communication with a telephone network, wherein the base unit is operable for executing a first algorithm disposed within the base unit and selectively allowing a telephone call received from the telephone network to be transmitted to a telephone handset belonging to a user and selectively preventing the telephone call received from the telephone network from being transmitted to the telephone handset belonging to the user. The automated telephone assistant device may also include an extension control device in communication with the base unit, wherein the extension control device is associated with a predetermined telephone extension and assists the base unit in selectively allowing the telephone call received from the telephone network to be transmitted to the telephone handset belonging to the user and selectively preventing the telephone call received from the telephone network from being transmitted to the telephone handset belonging to the user. The base unit and the extension control device communicate via a plurality of signals, wherein the plurality of signals direct the extension control device to generate a ring event for the telephone handset associated with the predetermined telephone extension. The base unit also includes a second algorithm operable for detecting the presence of and identifying the extension control device and a third algorithm operable for assigning a common name to the extension control device. The base unit further includes a permanent storage device operable for storing the identity and the common name of the extension control device, a dual-tone multi-frequency or voice interface operable for allowing the user to control the base unit and modify the first algorithm, and a voicemail message that is selectively transmitted to callers.

The first algorithm is operable for identifying a caller and selectively allowing the telephone call received from the telephone network to be transmitted to the telephone handset belonging to the user and selectively preventing the telephone call received from the telephone network from being transmitted to the telephone handset belonging to the user based upon the identity of the caller. The first algorithm is also operable for selectively allowing the telephone call received from the telephone network to be transmitted to the telephone handset belonging to the user and selectively preventing the telephone call received from the telephone network from being transmitted to the telephone handset belonging to the user based upon the time of day. The first algorithm is further operable for selectively allowing the telephone call received from the telephone network to be transmitted to one or more telephone handsets in one or more predetermined locations in a structure belonging to the user based upon the time of day and selectively preventing the telephone call received from the telephone network from being transmitted to the one or more telephone handsets in the one or more predetermined locations in the structure belonging to the user based upon the time of day. The first algorithm is further operable for selectively allowing the telephone call received from the telephone network to be transmitted to the telephone handset belonging to the user and selectively preventing the telephone call received from the telephone network from being transmitted to the telephone handset belonging to the user based upon the entry of an authorization code by a caller or the recognition of a caller's voice.

The base unit is operable for directing the telephone handset belonging to the user to produce a plurality of ring tones, each of the plurality of ring tones associated with the ascertained identity of a caller and the extension control device is operable for providing a common connection to a plurality of telephone lines.

In another embodiment of the present invention, an automated telephone assistant method includes providing a base unit in communication with a telephone network, disposing a first algorithm within the base unit, executing the first algorithm, selectively allowing a telephone call received from the telephone network to be transmitted to a telephone handset belonging to a user, and selectively preventing the telephone call received from the telephone network from being transmitted to the telephone handset belonging to the user. The automated telephone assistant method may also include providing an extension control device in communication with the base unit, wherein the extension control device is associated with a predetermined telephone extension and assists the base unit in selectively allowing the telephone call received from the telephone network to be transmitted to the telephone handset belonging to the user and selectively preventing the telephone call received from the telephone network from being transmitted to the telephone handset belonging to the user. The automated telephone assistant method further includes directing the extension control device to generate a ring event for the telephone handset associated with the predetermined telephone extension. The automated telephone assistant method further includes disposing a second algorithm within the base unit, the second algorithm operable for detecting the presence of and identifying the extension control device, disposing a third algorithm within the base unit, the third algorithm operable for assigning a common name to the extension control device, and storing the identity and the common name of the extension control device within a permanent storage device disposed within the base unit. The automated telephone assistant method further includes allowing the user to control the base unit and modify the first algorithm via a dual-tone multi-frequency or voice interface and selectively transmitting a voicemail message to callers.

The first algorithm is operable for identifying a caller and selectively allowing the telephone call received from the telephone network to be transmitted to the telephone handset belonging to the user and selectively preventing the telephone call received from the telephone network from being transmitted to the telephone handset belonging to the user based upon the identity of the caller. The first algorithm is also operable for selectively allowing the telephone call received from the telephone network to be transmitted to the telephone handset belonging to the user and selectively preventing the telephone call received from the telephone network from being transmitted to the telephone handset belonging to the user based upon the time of day. The first algorithm is further operable for selectively allowing the telephone call received from the telephone network to be transmitted to one or more telephone handsets in one or more predetermined locations in a structure belonging to the user based upon the time of day and selectively preventing the telephone call received from the telephone network from being transmitted to the one or more telephone handsets in the one or more predetermined locations in the structure belonging to the user based upon the time of day. The first algorithm is further operable for selectively allowing the telephone call received from the telephone network to be transmitted to the telephone handset belonging to the user and selectively preventing the telephone call received from the telephone network from being transmitted to the telephone handset belonging to the user based upon the entry of an authorization code by a caller or the recognition of a caller's voice.

The automated telephone assistant method further includes directing the telephone handset belonging to the user to produce a plurality of ring tones, each of the plurality of ring tones associated with the ascertained identity of a caller.

DETAILED DESCRIPTION OF THE INVENTION

Figure 1:
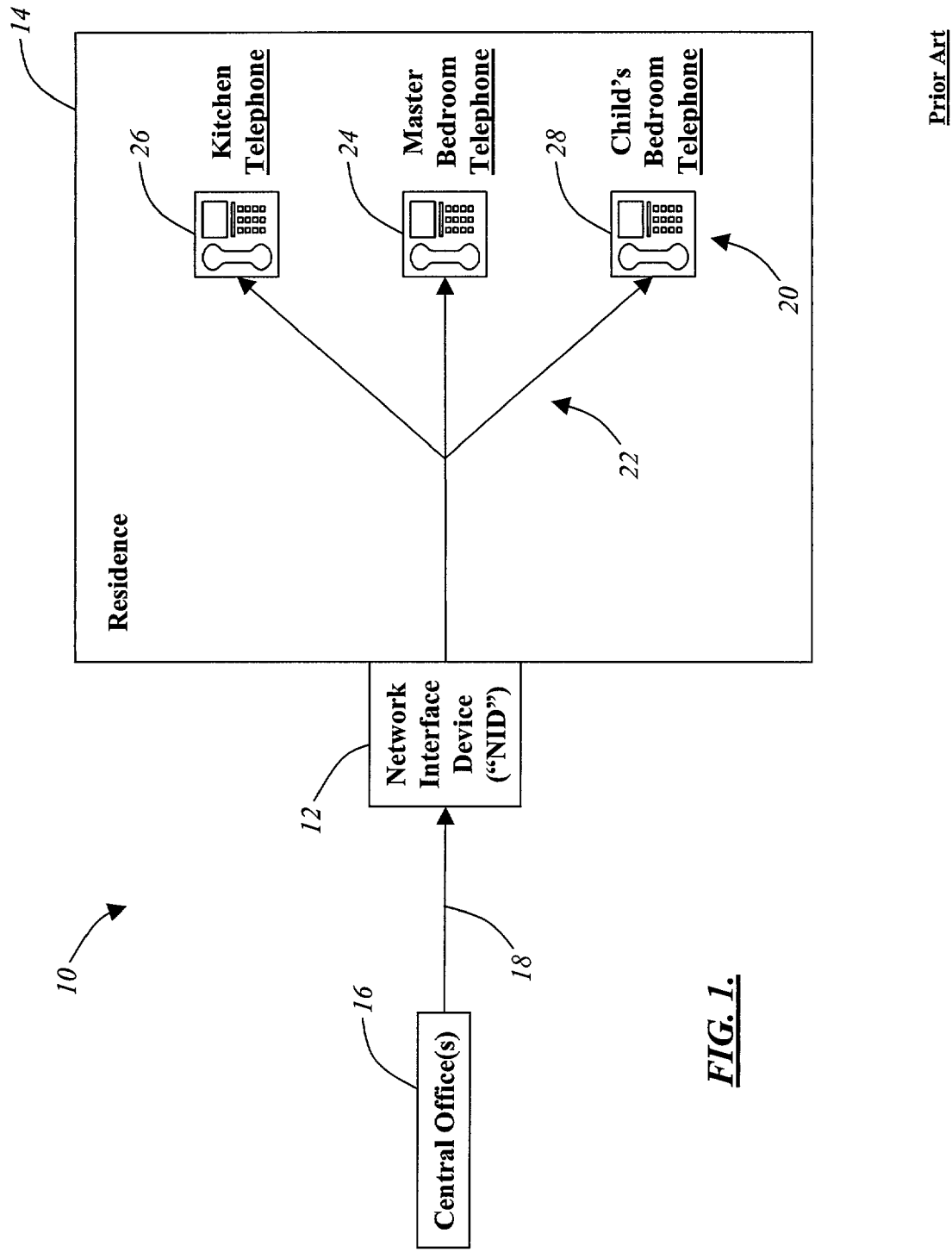
FIG. 1 is a schematic diagram of a conventional residential telephone system.

Referring to FIG. 1, a conventional residential telephone system 10 includes a network interface device ("NID") 12 disposed outside the residence 14. The NID 12 receives telephone calls from one or more central offices 16 via a trunk line 18. These central offices 16 may include, for example, Class-1 regional central offices, Class-2 sectional central offices, Class-3 primary central offices, Class-4 toll offices, and Class-5 end offices. The NID 12 transmits the telephone calls to one or more telephones 20 disposed inside the residence 14 via one or more telephone lines 22. It may be desirable, for example, to receive telephone calls only on a master bedroom telephone 24 in the middle of the night, while telephone calls to a kitchen telephone 26 and a child's bedroom telephone 28 on the same telephone line 22 are blocked.

Figure 2:
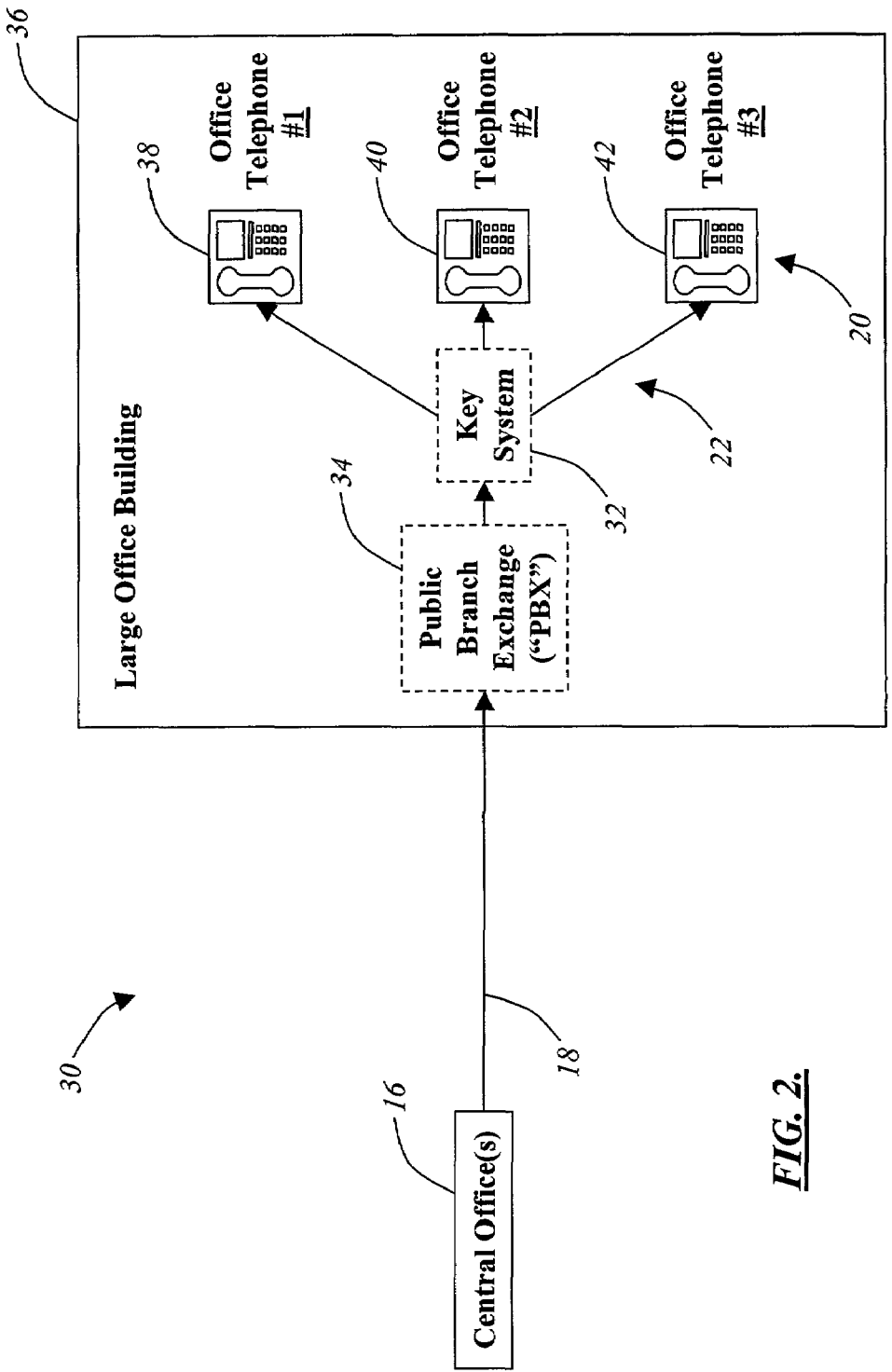
FIG. 2 is a schematic diagram of a conventional business telephone system.

What is needed is a device for a residence or a small office that functions like a key system or a public branch exchange ("PBX") utilized in large office buildings. Referring to FIG. 2, a conventional business telephone system 30 includes a key system 32 or a PBX 34 disposed inside the large office building 36. The key system 32 or the PBX 34 receive telephone calls from the one or more central offices 16 via the trunk line 18 and transmit the telephone calls to one or more telephones 20 disposed inside the large office building 36 via one or more telephone lines 22 (office telephone #1 38, office telephone #2 40, and office telephone #3 42 are shown). A key system 32 allows a large number of telephones 20 to share a relatively small number of telephone lines 22. For example, a typical key system 32 may allow about 4-150 telephones 20 to share about 2-100 telephone lines 22. A key system 32 may also accommodate, for example, facsimile ("fax") machines or personal computers ("PCs"), acting as a local-area network ("LAN"). A PBX 34 is a transmission and information processing system that may handle about one-hundred to several thousand telephone lines 22, providing such functions as caller identification ("caller ID") services, telephone call blocking services, automated attendant services, voicemail, least-cost routing, energy management services, and integrated voice and data services.

Figure 3:
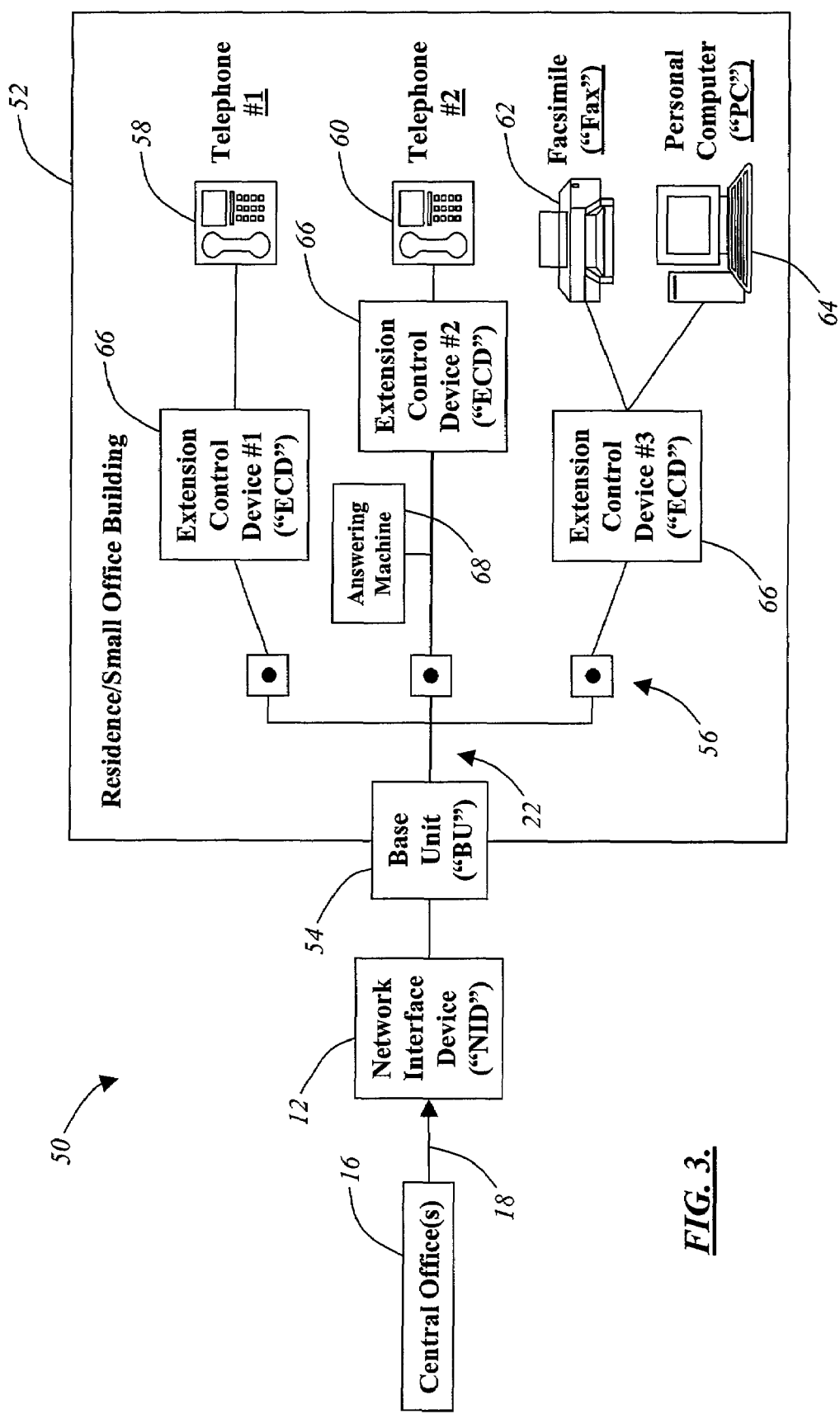
FIG. 3 is a schematic diagram of one embodiment of the automated telephone assistant device of the present invention, highlighting the operating environment of the automated telephone assistant device.

Referring to FIG. 3, in one embodiment of the present invention, a residential or small office building telephone system 50, suitable for providing "plain old telephone service" ("POTS"), includes a NID 12 disposed outside a residence or small office building 52. The NID 12 receives a telephone call from one or more central offices 16 via a trunk line 18. These central offices 16 may include, for example, Class-1 regional central offices, Class-2 sectional central offices, Class-3 primary central offices, Class-4 toll offices, and Class-5 end offices. The NID 12 transmits the telephone call to a base unit ("BU") 54 disposed inside or outside the residence or small office building 52. The BU 54 transmits the telephone call to a plurality of telephone jacks 56 disposed inside the residence or small office building 52 via one or more telephone lines 22. A plurality of telephones, fax machines, PCs, and the like are connected to the plurality of telephone jacks 56 (telephone #1 58, telephone #2 60, a fax machine 62, and a PC 64 are shown). Optionally, a plurality of extension control devices ("ECDs") 66, or inline couplers, are disposed between the plurality of telephone jacks 56 and the plurality of telephones, fax machines, and PCs. The plurality of ECDs 66 include a plurality of small "boxes" each having a male side and a female side, the male side being connected to one of the plurality of telephone jacks 56 and the female side being connected to one of the plurality of telephones, fax machines, and PCs.

Figure 4:
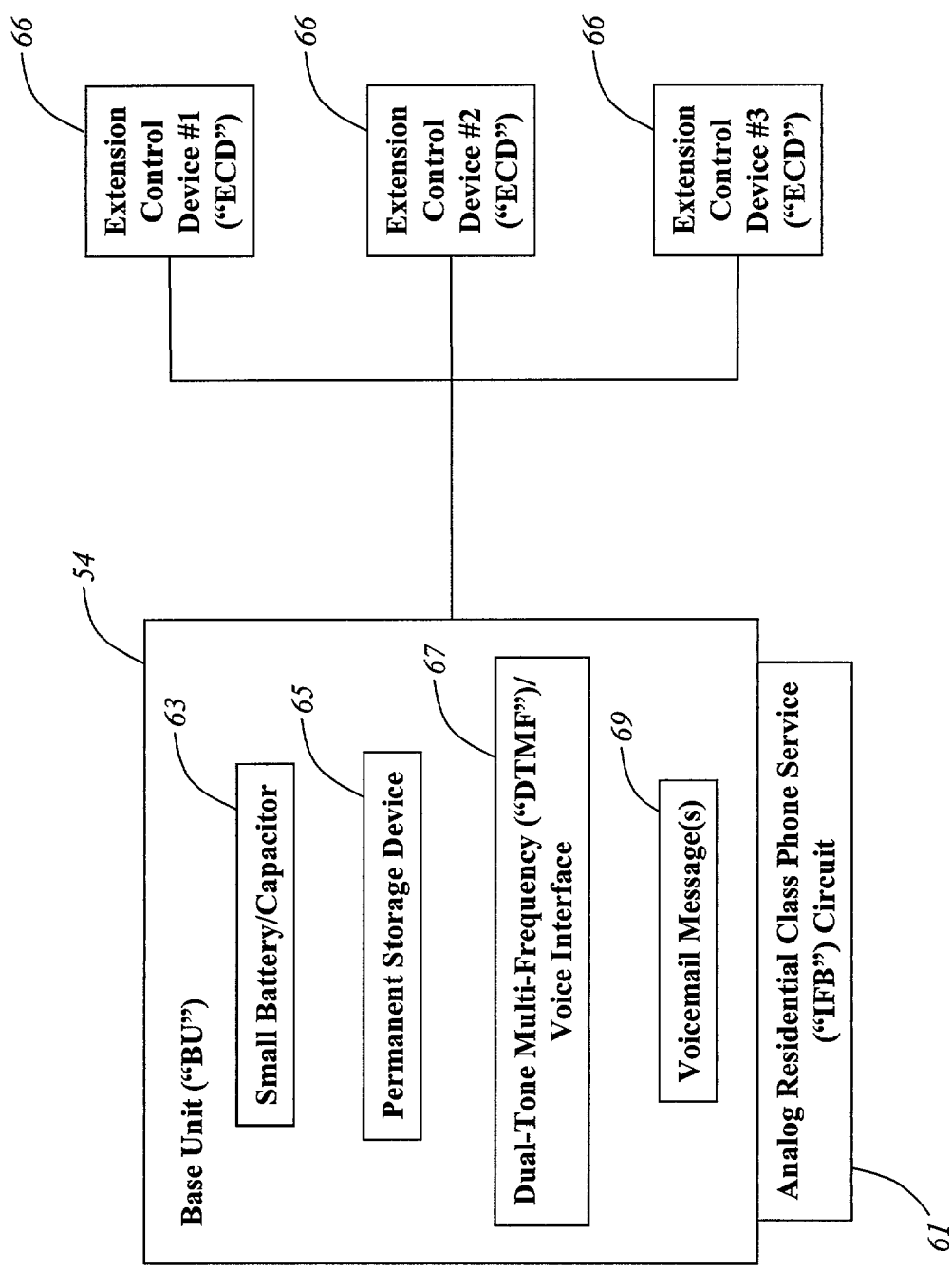
FIG. 4 is a schematic diagram of another embodiment of the automated telephone assistant device of the present invention, highlighting the components of the automated telephone assistant device.

Referring to FIGS. 3 and 4, the BU 54 is disposed on a conventional analog residential-class phone service ("IFB") circuit 61 and is in communication with the plurality of ECDs 66. The BU 54 communicates with the plurality of ECDs 66 via a non-audio frequency signal, preventing a user from hearing the signal while using telephone #1 58 or telephone #2 60. This non-audio frequency signal may be similar to that used by various digital subscriber line ("DSL") services. The plurality of ECDs 66 are powered by a current on the one or more telephone lines 22. Together, the BU 54 and the plurality of ECDs 66 represent an automated telephone assistant device and are operable for generating or blocking a ring event transmitted from the one or more telephone lines 22 to the plurality of telephones, fax machines, and PCs. A ring event is generated by a small battery and/or a capacitor 63 disposed within the BU 54 and/or each of the plurality of ECDs 66. The small battery and/or the capacitor 63 build up a small charge required to generate the ring event. Preferably, the ring event includes an alternating-current ("AC") waveform ring signal between about 15 and 70 Hz, more preferably between about 20 and 40 Hz. Alternatively, the BU 54 alone represents the automated telephone assistant device and performs the functions described above without the plurality of ECDs 66. An answering machine 68 or the like may be disposed between the plurality of telephone jacks 56 and the plurality of ECDs 66. Preferably, the BU 54 includes a clock device.

Figure 5:
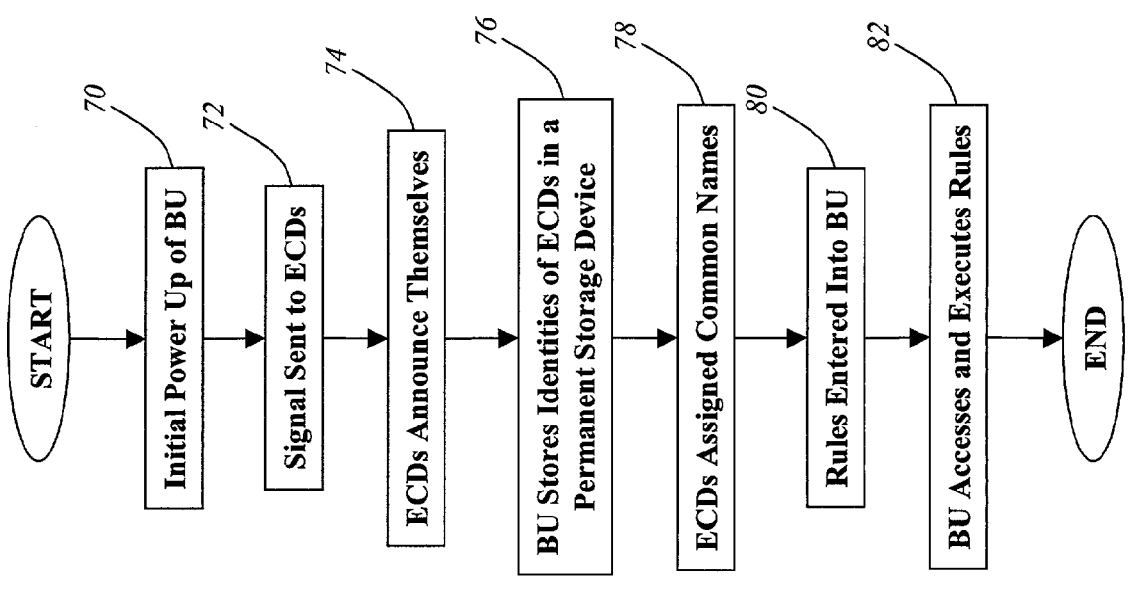
FIG. 5 is a block diagram of one embodiment of a method employed by the automated telephone assistant device of the present invention.

Referring to FIG. 5, in another embodiment of the present invention, the BU 54 (FIGS. 3 and 4) powers up (Block 70) and sends a signal to the plurality of ECDs 66 (FIGS. 3 and 4) via the one or more telephone lines 22 (FIG. 3) requesting that all connected ECDs 66 announce themselves (Block 72). At this point, all connected ECDs 66 do announce themselves (Block 74). A new ECD 66 placed in service after this process has occurred preferably automatically announces itself for a predetermined period of time, alerting the BU 54 to its presence. The BU 54 then stores the identities of the plurality of ECDs 66 in a permanent storage device 65 (FIG. 4) disposed within the BU 54 (Block 76). At this point, each of the plurality of ECDs 66 is assigned a common name by the BU 54 (Block 78), such as "Master Bedroom," "Kitchen," "Child's Bedroom," "Office #1," "Office #2,""Office #3," or the like. Algorithms or rules are then entered into the BU 54 by the user via a dual-tone multi-frequency ("DTMF") or voice interface 67 (FIG. 4) disposed within the BU 54, through a handset connected to an ECD 66, or through an associated PC interface (Block 80). Finally, these rules are accessed and executed by the BU 54 and/or the plurality of ECDs 66. A simple rule may relate to time of day and a predetermined ECD 66. For example, the rule may describe, "between 11 pm and 6 am do not ring any extension except 'Master Bedroom.'"The rule may also describe, "turn off 'Child's Bedroom' between 9 pm and 3 pm."(Block 82)

As described above, the automated telephone assistant device may identify and block a telephone call from an unwanted caller before the telephone call reaches the user's telephone. Such a telephone call may also be identified and answered by voicemail. A prerecorded voicemail message 69 (FIG. 4) may be stored in the BU 54 for use when after-hours rules are in effect. The BU 54 may also present a menu of options to the caller, instructing them to call back at a more appropriate time, record a message, or announce themselves, at which point the BU 54 generates a ring event in the appropriate ECD 66 if the announcement is accepted. The automated telephone assistant device may also block a telephone call received at an undesired time before the telephone call reaches the user's telephone. Such a telephone call may also be answered by voicemail. The automated telephone assistant device may further allow only telephones, fax machines, PCs, and the like located in predetermined rooms of a residence or offices of a small office building to receive telephone calls at predetermined times.

Optionally, the automated telephone assistant device may incorporate a plurality of other functionalities as well. For example, the automated telephone assistant device may provide the user with the announcement described above, identifying the caller. The user may then be allowed to push a button on an ECD or on his or her handset, sending a DTMF signal to the BU 54 directing the BU 54 to provide the caller with a "don't call again" voicemail message, or temporarily or permanently blocking the caller's telephone number. If caller ID is enabled on the user's telephone, the caller's telephone number may be delivered after the caller's announcement is provided. The voice message may include prerecorded single numbers that are concatenated into a 10-digit telephone number.

The automated telephone assistant device may also incorporate code or voice recognition capabilities, allowing the BU 54 to identify and selectively permit telephone calls from predetermined callers, such as family members. The automated telephone assistant device may further incorporate two line switching capabilities and/or provide a distinctive ring on the user's telephone depending upon the identity of the caller. Advantageously, the two line switching capabilities allow an ECD 66 to be connected to two or more incoming telephone lines 22, providing one outgoing telephone line 22. A user picking up his or her telephone may then hear another user on the same first telephone line 22, and may enter a code or press a button to switch to another second telephone line.

It is apparent that there has been provided, in accordance with the present invention, an automated telephone assistant device. While the present invention has been shown and described in conjunction with examples and preferred embodiments thereof, variations in and modifications to the present invention may be effected by those of ordinary skill in the art without departing from the spirit or scope of the invention. It is therefore to be understood that the principles described herein apply in a similar manner, where applicable, to all examples and preferred embodiments and the following claims are intended to cover all such equivalents.

What is claimed is:

1. An automated telephone assistant device, comprising:
a base unit in communication with an extension control device, the base unit connecting at least one telephone jack to a network interface device, the network interface device in communication with a telephone network, the base unit communicating with the extension control device via a non-audio signal, the extension control device receiving power from a current on a telephone line, the extension control device building up a charge that generates a ring event on the telephone line, at least one of the base unit and the extension control device executing at least a first algorithm, the algorithm entered and modifiable to the base unit by a user through the extension control device, the first algorithm selectively communicating an incoming telephone call received from the telephone network to a selected telephone jack via the base unit, the base unit accessing one or more user-defined rules to select the telephone jack and to route the incoming communication to the selected telephone jack, the base unit further accessing another user-defined rule to prevent routing of the incoming communication to the selected telephone jack such that an idle, selected telephone jack maintains an on-hook state of a telephone line serving the telephone jack during communication of the incoming telephone call to the base unit.

2. The automated telephone assistant device of claim 1, wherein the extension control device is associated with a predetermined telephone extension of the selected telephone jack and assists the base unit in selectively processing the incoming telephone call.

3. The automated telephone assistant device of claim 2, wherein the base unit and the extension control device communicate via a plurality of signals, wherein the plurality of signals direct the extension control device to generate a ring event for a telephone of the selected telephone jack associated with the predetermined telephone extension.

4. The automated telephone assistant device of claim 2, wherein the base unit further comprises a second algorithm operable for detecting the presence of and identifying the extension control device.

5. The automated telephone assistant device of claim 4, wherein the base unit further comprises a third algorithm operable for assigning a common name to the extension control device.

6. The automated telephone assistant device of claim 5, wherein the base unit further comprises a permanent storage device operable for storing the identity and the common name of the extension control device.

7. The automated telephone assistant device of claim 1, wherein the base unit further comprises a dual-tone multi-frequency interface operable for allowing a user to control the base unit and modify the first algorithm.

8. The automated telephone assistant device of claim 1, wherein the base unit further comprises a voice interface operable for allowing the user to control the base unit and modify the first algorithm.

9. The automated telephone assistant device of claim 1, wherein the base unit further comprises a voicemail message that is selectively transmitted to callers.

10. The automated telephone assistant device of claim 1, wherein the first algorithm is operable for identifying a caller.

11. The automated telephone assistant device of claim 10, wherein the base unit selectively routes the incoming telephone call to the selected telephone jack having a user-defined rule that matches an instruction to route the incoming telephone call to the selected telephone jack based upon the identity of the caller, and wherein the base unit further selectively prevents routing of the incoming telephone call received from the telephone network to the selected telephone jack having another user-defined rule that matches an instruction to prevent routing of the incoming telephone call to the selected telephone jack based upon the identity of the caller.

12. The automated telephone assistant device of claim 1, wherein the base unit selectively routes the incoming telephone call to the selected telephone jack having a user-defined rule to route the incoming telephone call to the selected telephone jack based upon the time of day, and selectively prevents routing of the incoming telephone call received from the telephone network to the selected telephone jack having another user-defined rule to prevent routing of the incoming telephone call to the selected telephone jack based upon the time of day.

13. The automated telephone assistant device of claim 1, wherein the base unit selectively routes the incoming telephone call received from the telephone network to one or more telephone jacks in one or more predetermined locations in a structure matching the user-defined rule based upon the time of day and selectively prevents routing of the incoming telephone call received from the telephone network to the one or more telephone jacks in the one or more predetermined locations in the structure matching the user-defined rule based upon the time of day.

14. The automated telephone assistant device of claim 1, wherein the base unit selectively routes the incoming telephone call received from the telephone network to the selected telephone jack having a user-defined rule to route the incoming telephone call to the selected telephone jack based upon entry of an authorization code by a caller, and selectively prevents routing of the incoming telephone call received from the telephone network to the selected telephone jack having another user-defined rule to prevent routing of the incoming telephone call to the selected telephone jack based upon entry of the authorization code by a caller.

15. The automated telephone assistant device of claim 1, wherein the base unit selectively routes the incoming telephone call to the selected telephone jack having a user-defined rule to route the incoming telephone call to the selected telephone jack based upon recognition of a caller's voice, and selectively prevents routing of the incoming telephone call received from the telephone network to the selected telephone jack having another user-defined rule to prevent routing of the incoming telephone call to the selected telephone jack based upon recognition of the caller's voice.

16. The automated telephone assistant device of claim 1, wherein the base unit is operable for directing the selected telephone jack to produce a plurality of ringing tones, each of the plurality of ringing tones associated with the ascertained identity of a caller.

17. The automated telephone assistant device of claim 2, wherein the extension control device is operable for providing a common connection to a plurality of telephone lines.

18. An automated telephone assistant method, comprising:
providing a base unit in communication with an extension control device, the base unit connecting at least one telephone jack to a network interface device, the network interface device in communication with a telephone network, the base unit communicating with the extension control device via a non-audio signal, the extension control device receiving power from a current on a telephone line, the extension control device building up a charge that generates a ring event on the telephone line;

accessing at least a first algorithm within the base unit, the first algorithm entered and modifiable to the base unit by a user through the extension control device and comprising one or more user-defined rules for selectively processing the incoming telephone call received from the telephone network, the one or more user-defined rules comprising a user-defined selection rule to select the telephone jack, a user-defined routing rule to route the incoming telephone call to the selected telephone jack, a user-defined blocking rule to prevent routing of the incoming communication to the selected telephone jack such that an idle, selected telephone jack maintains an on-hook state of a telephone line serving the selected telephone jack during communication of the incoming telephone call to the base unit;

executing the first algorithm by at least one of the base unit and the extension control device;

when the user-defined rule comprises a routing instruction, then selectively routing an incoming telephone call received from the telephone network to be routed to the selected telephone jack; and when the user-defined rule comprises a blocking instruction, then selectively preventing the incoming telephone call received from the telephone network from being routed to the selected telephone jack.

19. The automated telephone assistant method of claim 18, wherein the extension control device is associated with a predetermined telephone extension of the selected telephone jack and assists the base unit in selectively processing the incoming telephone call received from the telephone network.

20. The automated telephone assistant method of claim 19, further comprising directing the extension control device to generate a ring event for the selected telephone jack associated with the predetermined telephone extension.

21. The automated telephone assistant method of claim 19, further comprising disposing a second algorithm within the base unit, the second algorithm detecting the presence of and identifying the extension control device.

22. The automated telephone assistant method of claim 21, further comprising disposing a third algorithm within the base unit, the third algorithm assigning a common name to the extension control device.

23. The automated telephone assistant method of claim 22, further comprising storing the identity and the common name of the extension control device within a permanent storage device disposed within the base unit.

24. The automated telephone assistant method of claim 18, further comprising allowing a user to control the base unit and modify the first algorithm via a dual-tone multi-frequency interface.

25. The automated telephone assistant method of claim 18, further comprising allowing a user to control the base unit and modify the first algorithm via a voice interface.

26. The automated telephone assistant method of claim 18, further comprising selectively transmitting a voicemail message to callers.

27. The automated telephone assistant method of claim 18, wherein the first algorithm identifies a caller.

28. The automated telephone assistant method of claim 27, wherein the base unit selectively routes the incoming telephone call to the selected telephone jack based upon the identity of the caller, and selectively prevents routing of the incoming telephone call to the selected telephone jack based upon the identity of the caller.

29. The automated telephone assistant method of claim 18, wherein the base unit selectively routes the incoming telephone call to the selected telephone jack based upon the time of day, and selectively prevents routing of the incoming telephone call to the selected telephone jack based upon the time of day.

30. The automated telephone assistant method of claim 18, wherein the base unit selectively routes the incoming telephone call received from the telephone network to one or more telephone jacks in one or more predetermined locations in a structure matching the user-defined rule based upon the time of day and selectively prevents routing of the incoming telephone call received from the telephone network to the one or more telephone jacks in the one or more predetermined locations in the structure matching the user-defined rule based upon the time of day.

31. The automated telephone assistant method of claim 18, wherein the base unit selectively routes the incoming telephone call received from the telephone network to the selected telephone jack having a user-defined rule to route the incoming telephone call to the selected telephone jack based upon entry of an authorization code by a caller, and selectively prevents routing of the incoming telephone call received from the telephone network to the selected telephone jack having another user-defined rule to prevent routing of the incoming telephone call to the selected telephone jack based upon entry of the authorization code by a caller.

32. The automated telephone assistant method of claim 18, wherein the base unit selectively routes the incoming telephone call to the selected telephone jack having a user-defined rule to route the incoming telephone call to the selected telephone jack based upon recognition of a caller's voice, and selectively prevents routing of the incoming telephone call received from the telephone network to the selected telephone jack having another user-defined rule to prevent routing of the incoming telephone call to the selected telephone jack based upon recognition of the caller's voice.

33. The automated telephone assistant method of claim 18, further comprising directing the selected telephone jack to produce a plurality of ring tones, each of the plurality of ring tones associated with the ascertained identity of a caller.

* * * * *